United States Patent
Mattern et al.

(10) Patent No.: US 11,019,926 B2
(45) Date of Patent: Jun. 1, 2021

(54) TELESCOPIC RAIL

(71) Applicant: Liebherr-Verzahntechnik GmbH, Kempten (DE)

(72) Inventors: Thomas Mattern, Rieden (DE); Markus Zollitsch, Haldenwang (DE); Florian Hoessle, Immenstadt (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 0 days.

(21) Appl. No.: 16/530,969

(22) Filed: Aug. 2, 2019

(65) Prior Publication Data
US 2020/0040939 A1 Feb. 6, 2020

(30) Foreign Application Priority Data
Aug. 3, 2018 (DE) .......................... 102018118973.7

(51) Int. Cl.
*F16C 29/02* (2006.01)
*F16C 29/04* (2006.01)
(Continued)

(52) U.S. Cl.
CPC ............ *A47B 88/493* (2017.01); *B65G 21/22* (2013.01); *F24C 15/168* (2013.01);
(Continued)

(58) Field of Classification Search
CPC ........ F16C 29/02; F16C 29/043; F16C 33/38; F24C 15/168; B65G 7/12; B65G 9/00;
(Continued)

(56) References Cited

U.S. PATENT DOCUMENTS 3,687,505 A   8/1972   Fall et al.
5,314,253 A * 5/1994   Grass, Jr. ............ A47B 88/493
                                                     384/19
(Continued)

FOREIGN PATENT DOCUMENTS

AT            360699 B      1/1981
CN        202606877 U  *  12/2012
(Continued)

*Primary Examiner* — Marcus Charles
(74) *Attorney, Agent, or Firm* — McCoy Russell LLP

(57) ABSTRACT

The present invention shows a telescopic rail having at least one inner, middle, and outer rail element, wherein the inner and outer rail elements are each longitudinally displaceably supported at the middle rail element over rolling members that are guided in a rolling member cage. Provision is made in accordance with a first aspect that the rail elements are mechanically force-coupled via a rail synchronization arrangement such that on a longitudinal displacement of the outer rail element with respect to the inner rail element, the middle rail element is longitudinally displaced with respect to both the inner rail element and the outer rail element. Provision is made in accordance with a second aspect that at least one rolling member cage, and preferably both rolling member cages, is/are mechanically force-coupled to at least one of the rail elements via a respective rolling member cage synchronization arrangement such that a longitudinal displacement of the middle rail element with respect to the inner or outer rail elements results in a longitudinal displacement of the corresponding rolling member cage with respect to the middle rail element.

18 Claims, 8 Drawing Sheets

(51) Int. Cl.
*F16C 33/38* (2006.01)
*B65G 21/22* (2006.01)
*F24C 15/16* (2006.01)
*A47B 88/49* (2017.01)
*A47B 88/493* (2017.01)

(52) U.S. Cl.
CPC . *A47B 2210/007* (2013.01); *A47B 2210/0016* (2013.01); *A47B 2210/0032* (2013.01); *A47B 2210/0035* (2013.01); *A47B 2210/0075* (2013.01); *F16C 29/043* (2013.01); *F16C 33/38* (2013.01)

(58) Field of Classification Search
CPC ............ B65G 21/22; A47B 2210/0016; A47B 2210/0032; A47B 2210/007; A47B 2210/0075; A48B 2210/0035
USPC .............................. 384/17–19, 47, 49, 51, 35
See application file for complete search history.

(56) References Cited

U.S. PATENT DOCUMENTS

| | | | | |
|---|---|---|---|---|
| 5,551,775 A | * | 9/1996 | Parvin | A47B 88/493 312/334.11 |
| 6,296,338 B1 | * | 10/2001 | Stijns | A47B 88/493 312/333 |
| 6,378,968 B1 | * | 4/2002 | Weng | A47B 88/493 312/334.11 |
| 6,554,379 B2 | * | 4/2003 | Devine | A47B 88/57 292/81 |
| 7,029,080 B2 | * | 4/2006 | Barry, Jr. | H05K 7/1489 312/333 |
| 7,850,369 B2 | * | 12/2010 | Young | A47B 88/493 384/18 |
| 9,723,746 B2 | * | 8/2017 | Chen | A47B 88/43 |
| 2018/0022548 A1 | * | 1/2018 | Mattern | B66F 9/07 414/279 |

FOREIGN PATENT DOCUMENTS

| | | | | | |
|---|---|---|---|---|---|
| CN | 206128738 U | * | 4/2017 | | |
| CN | 206181584 U | * | 5/2017 | | |
| CN | 106915584 A | * | 7/2017 | | |
| CN | 108125426 A | * | 6/2018 | | |
| DE | 1192462 B | | 5/1965 | | |
| DE | 2227931 A1 | | 12/1972 | | |
| DE | 2904116 A1 | | 8/1980 | | |
| DE | 3026544 A1 | | 2/1981 | | |
| DE | 3219212 A1 | | 10/1983 | | |
| DE | 4142060 A1 | | 6/1992 | | |
| DE | 19815525 A1 | | 10/1999 | | |
| DE | 10040492 A1 | | 2/2002 | | |
| DE | 20302122 U1 | | 5/2003 | | |
| DE | 102006007978 A1 | * | 8/2007 | ............ | F24C 15/168 |
| DE | 102016210751 A1 | | 12/2017 | | |
| DE | 102016009000 A1 | | 1/2018 | | |
| EP | 46531 A | * | 3/1982 | ............ | A47B 88/493 |
| EP | 1236912 A2 | | 9/2002 | | |
| EP | 1277422 A1 | * | 1/2003 | ............ | A47B 88/493 |
| EP | 1516563 A1 | | 3/2005 | | |
| EP | 1927300 A1 | * | 6/2008 | ............ | A47B 88/493 |
| EP | 2397712 A1 | | 12/2011 | | |
| GB | 2022992 A | * | 12/1979 | ............ | A47B 88/493 |
| GB | 2434081 A | * | 7/2007 | ............ | A47B 88/493 |
| WO | WO-2008135425 A1 | * | 11/2008 | ............ | A47B 88/443 |

* cited by examiner

US 11,019,926 B2

TELESCOPIC RAIL

CROSS-REFERENCE TO RELATED APPLICATIONS

The present application claims priority to German Application No. DE 10 2018 118 973.7 entitled "TELESKOPSCHIENE", filed on Aug. 3, 2018. The entire contents of the above listed application are hereby incorporated by reference for all purposes.

TECHNICAL FIELD

The present invention relates to a telescopic rail having at least one inner, middle, and outer rail element, wherein the inner and outer rail elements are each longitudinally displaceably supported at the middle rail element over rolling members that are guided in a rolling member cage.

BACKGROUND AND SUMMARY

It is in particular a telescopic rail for a workpiece handling system in which a handling element for workpieces, in particular a gripper, a fork and/or a placement board, is arranged at a base element via at least two telescopic rails. Such a workpiece handling system is known from DE 10 2016 009 000 A1.

The drive of such a telescopic rail can, for example, take place via a linear drive, for example in the form of a peripheral belt that engages at the outer rail element. When the outer rail element is pulled out, the middle rail element and the rolling member cages are, however, taken along in an uncontrolled manner, which can result in increased wear and in jamming.

It is therefore known from DE 100 40 492 A1 to provide all the rail elements with a gear rack at which a respective one pinion engages that is driven by a drive unit. A controlled, successive extension of the rail elements should hereby be achieved. However, this solution requires a substantial construction effort and at best only partially solves the existing problems.

In the field of linear guides, respective forced guides for a rolling member cage are known from the documents EP 1 236 912 A2, DE 198 15 525 A1, DE 1 192 462, EP 2 397 712 A1 and DE 10 2016 210 751 A1.

It is the object of the present invention to provide an improved telescopic rail.

This object is achieved, for example, by a telescopic rail having at least one inner, middle, and outer rail element, wherein the inner and outer rail elements are each longitudinally displaceably supported at the middle rail element over rolling members that are guided in a rolling member cage. The first aspect is characterized in that the rail elements are mechanically force-coupled via a rail synchronization arrangement such that on a longitudinal displacement of the outer rail element with respect to the inner rail element, the middle rail element is longitudinally displaced with respect to both the inner rail element and the outer rail element. No separate drive of the individual rail elements is hereby required and a controlled extension of the rail elements is nevertheless made possible.

In a second aspect, the present invention comprises a telescopic rail having at least one inner, middle, and outer rail element, wherein the inner and outer rail elements are each longitudinally displaceably supported at the middle rail element over rolling members that are guided in a rolling member cage. The second aspect is characterized in that at least one rolling member cage, and preferably both rolling member cages, is/are mechanically force-coupled to at least one of the rail elements via a respective rolling member cage synchronization arrangement such that a longitudinal displacement of the middle rail element with respect to the inner or outer rail elements results in a longitudinal displacement of the corresponding rolling member cage with respect to the middle rail element. An uncontrolled migration of the rolling member cage and a jamming of the telescopic rail associated therewith are hereby prevented.

The first and second aspects of the present invention can be used independently of one another and each form separate subject matters of the invention independently of one another.

The first and second aspects of the present invention are, however, preferably used in combination. A particularly low wear and disruption free operation of the telescopic rail results from this combination of a synchronized movement of the rail elements and of a movement of the rolling member cages synchronized again with respect hereto.

When an inner rail element and an outer rail element are spoken of within the framework of the present invention, this has a purely illustrative character and does not either restrict the embodiment or the arrangement of the inner and outer rail elements, but is rather synonymous with a first rail element and a second rail element.

However, the inner rail element preferably represents the static element via which the telescopic rail is fastened to a base element in the installed situation and the outer rail element represents the displaceable element to which a load that is to be moved is attached.

Provision is made in a possible embodiment of the present invention that the rolling member cage synchronization arrangement is configured such that the longitudinal displacement of the rolling member cage with respect to the middle rail element corresponds to half the longitudinal displacement of the corresponding rail element with respect to the middle rail element. The rolling member cage hereby remains at the center of the overlap zone of the associated rail elements.

Provision is made in a possible embodiment of the present invention that the rail synchronization arrangement is configured such that the longitudinal displacement of the inner rail element with respect to the middle rail element corresponds to the longitudinal displacement of the middle rail element with respect to the outer rail element. A synchronous movement hereby results by which the middle and outer rail elements simultaneously reach their end positions.

Provision is made in a possible embodiment of the present invention that the rail synchronization arrangement comprises a pinion that is supported at the middle rail element and meshes with gear racks that are provided at the inner rail element and at the outer rail element.

The pinion is preferably supported on an upper side or on a lower side of the middle rail element. The gear racks are preferably fastened to the inner and outer rail elements such that they project over the upper side of the middle rail element. The axis of rotation of the pinion is preferably vertically aligned. The gear racks are preferably fastened as separate elements to the inner and outer rail elements, in particular respectively via an assembly plate laterally fastened to the inner or outer rail elements.

Provision is made in a possible embodiment of the present invention that the rail synchronization arrangement comprises at least one pulling element, in particular a rope or a belt, whose ends are fastened to the inner rail element and to the outer rail element and that is deflected via a deflection element provided at the middle rail element, with two pulling elements that act in opposite directions preferably being provided.

Provision is made in a possible embodiment of the present invention that at least one rolling member cage synchronization arrangement, and preferably both rolling member cage synchronization arrangements, comprises/comprise a pinion that is supported at the rolling member cage and meshes with gear racks that are provided at the rail elements associated with the respective rolling member cage.

The axis of rotation of the pinion preferably extends in a plane perpendicular to the longitudinal axis of the telescopic rail.

The pinion can, for example, have a vertical axis of rotation. In this case, mutually oppositely disposed regions of its periphery preferably mesh with the gear racks arranged at the respective rail elements.

The pinion can, for example, also have a horizontal axis of rotation. It is preferably in two parts in this case.

In a possible embodiment, the gear racks are introduced, for example by milling, into the material of the respective rail element. Construction space can hereby in particular be saved with a vertical axis of rotation.

In a possible embodiment, the gear racks are preferably connected to the respective rail element as separate elements.

Provision is made in a possible embodiment of the present invention that the inner rail element and/or the outer rail element has/have two parallel guide paths that are preferably arranged above one another in a vertical direction and/or are aligned in opposite directions, that are associated with corresponding guide paths of the middle rail element, and on which the rolling members roll off, with the rolling member cages for the rolling members associated with the two guide paths being connected to one another via a connection region. A particularly good resilience of the telescopic rail hereby results.

In a preferred embodiment, the roll member cages for the rolling members associated with the two guide paths and the connection region are formed in one piece, for example as a bent sheet metal section.

In a further preferred embodiment, the connection region extends between mutually facing side surfaces of the middle rail element and of the inner or outer rail element. The rolling member cages can engage around the inner or outer rail element.

Provision is made in a possible embodiment of the present invention that the rolling member cage synchronization arrangement is arranged and/or engages at the connection region. An advantageous embodiment with respect to the force distribution and the construction space is hereby ensured.

In a possible embodiment of the present invention, a pinion of the rolling member cage synchronization arrangement is supported at the connection region.

In a possible embodiment of the present invention, the middle rail element and/or the inner or outer rail element has/have a groove-shaped cutout in which one or more elements of the rolling member cage synchronization arrangement are provided. The groove-shaped cutout provides the required construction space for the rolling member cage synchronization arrangement arranged at the connection region.

Provision is made in a possible embodiment of the present invention that both the upper rolling member cage and the lower rolling member cage, that are connected by the connection arrangement, have an entrainer section at which the rolling member cage synchronization arrangement is arranged and/or engages. The entrainer section is preferably respectively provided on the side of the respective rolling member cage remote from the connection region and can in particular be outwardly guided from the region between the rail elements. An advantageous embodiment with respect to the force distribution and the construction space is also hereby ensured.

Provision is made in a possible embodiment of the present invention that the rolling member cage synchronization arrangements are only force-coupled to the rail synchronization arrangement via the respective rail elements.

Provision is made in a possible alternative embodiment of the present invention that the rolling member cage synchronization arrangements are force-coupled to the rail synchronization arrangement via a respective coupling arrangement.

Provision is made in a possible alternative embodiment of the present invention that the rolling member cages are driven via at least one pulling element, in particular a belt, by the rail synchronization arrangement, with the pulling element preferably coupling the rolling member cages to one another and/or running around a drive element that is driven by a pinion of the rail synchronization arrangement and/or is supported at the middle rail element.

Provision is made in a possible embodiment of the present invention that the rolling member cage synchronization arrangement comprises at least one pulling element, in particular a rope or a belt, via which the rolling member cage is connected to the middle rail element and to the inner or outer rail element, with the pulling element preferably being guided in the form of a pulley around a deflection element that is connected to the rolling member cage. A further deflection element is preferably provided at the middle rail element and/or at the inner or outer rail element.

In a possible alternative arrangement of the present invention, separate pulling elements that are preferably each guided in the form of a pulley around a deflection element are provided for movements in both directions.

In a possible embodiment of the present invention, the telescopic rail has a drive that engages at the inner rail element or at the outer rail element to displace the rail elements with respect to one another, with the drive preferably taking place via a belt that runs around and that is coupled to the inner rail element or to the outer rail element via an entrainer.

Provision is made in a possible embodiment of the present invention that the outer rail element is longitudinally displaceable by a maximum of its own length with respect to the inner rail element.

Provision is made in a possible embodiment of the present invention that the middle rail element engages around the inner rail element and/or the outer rail element on the upper side and lower side, with the inner and/or outer rail elements preferably having guide paths on the lower side and on the upper side on which the rolling members roll off.

The present invention further comprises a workpiece handling system having at least one telescopic rail such as was described above.

A handling element for workpieces, in particular a gripper, a fork, and/or a placement board, is in this respect preferably arranged via at least two telescopic rails at a base element, with the base element preferably having one or more axes of movement.

Provision is made in a possible embodiment of the present invention that it is a racking storage and retrieval vehicle for a pallet storage system, with the handling element preferably serving the introduction and/or removal of workpieces and/or pallets in storage compartments.

The racking storage and retrieval vehicle and the pallet storage system can in particular be configured such as is known from DE 10 2016 009 000 A1. The content of DE 10 2016 009 000 A1 is therefore completely made the subject matter of the present invention.

BRIEF DESCRIPTION OF FIGURES

The present invention will now be explained in more detail with reference to drawings and to embodiments.

There are shown.

DETAILED DESCRIPTION

A first embodiment of a telescopic rail in accordance with the present invention is shown in FIGS. 1 to 5. The basic structure of the telescopic rail explained with reference to this embodiment is, however, also used in the other embodiments.

The telescopic rail has an inner rail element 2, a middle rail element 3, and an outer rail element 4. The telescopic rail can be fastened to a base element by the inner rail element, for example, via the installation bracket 1.

A linear drive, not shown, via which the outer rail element is longitudinally displaceable with respect to the base element and thus with respect to the rail element engages at the outer rail element.

The linear drive is, for example, a belt that extends in parallel with the outer rail element and runs around two pulleys, with at least one of the two pulleys being driven by a motor. The belt is here connected via an entrainer to the outer rail element and moves the latter. Alternatively, however, a drive, for example via a hydraulic or pneumatic cylinder, would also be conceivable.

All three rail elements have a bar-shaped basic shape, with the rail elements being arranged next to one another at least in a middle region. The height of the rail elements is preferably greater than its thickness in the region in which all three rail elements are arranged next to one another, preferably at least three times as much as the thickness.

Figure 1:
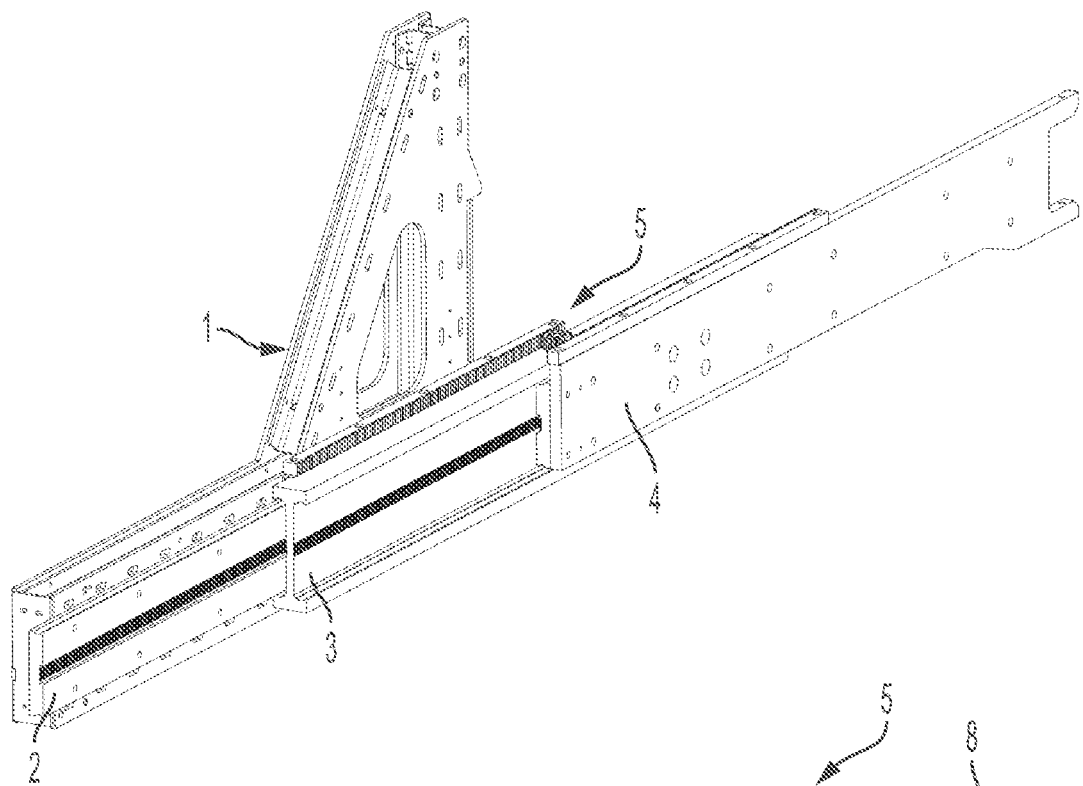
FIG. 1 a first embodiment of a telescopic rail in accordance with the invention in which both aspects of the present invention are implemented.
Figure 2:
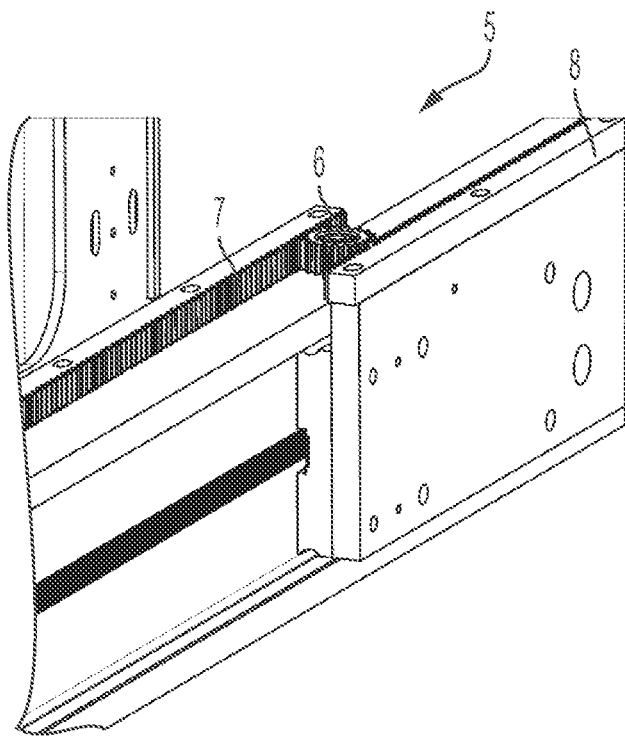
FIG. 2 a detailed view of the first embodiment of a telescopic rail in accordance with the invention.
Figure 3:
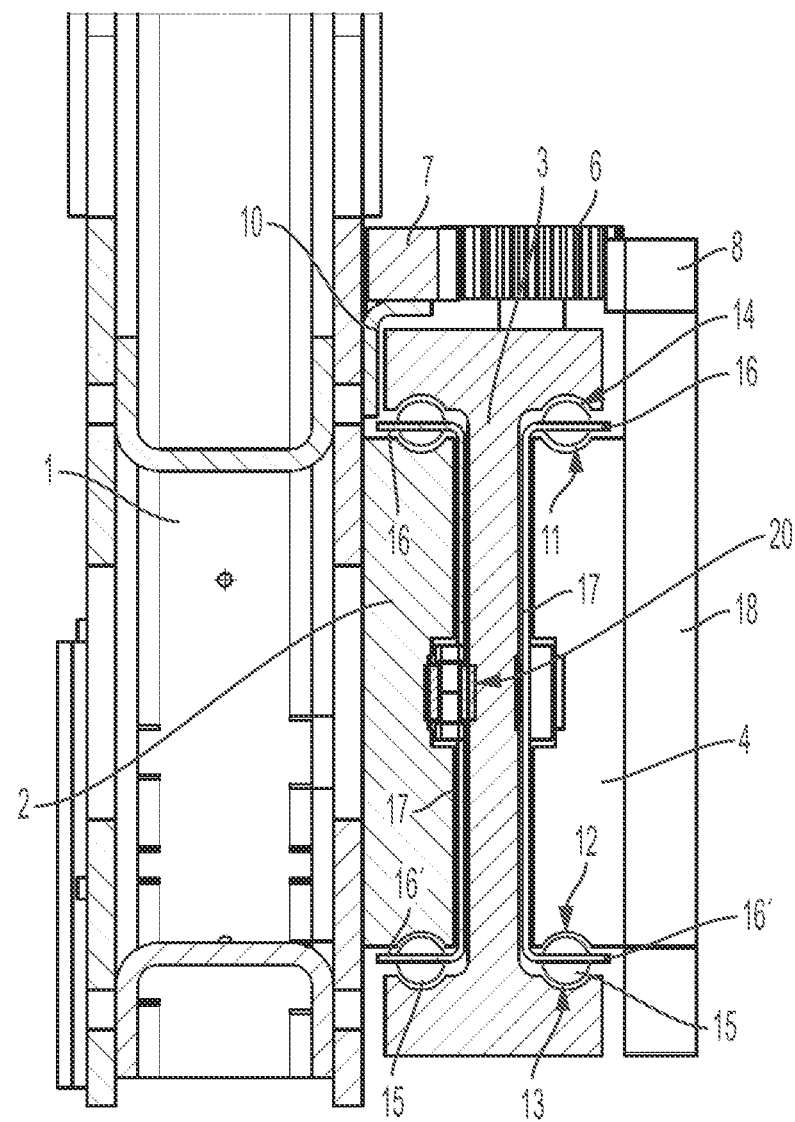
FIG. 3 a sectional view perpendicular to the longitudinal axis of the first embodiment of a telescopic rail in accordance with the invention.
Figure 4:
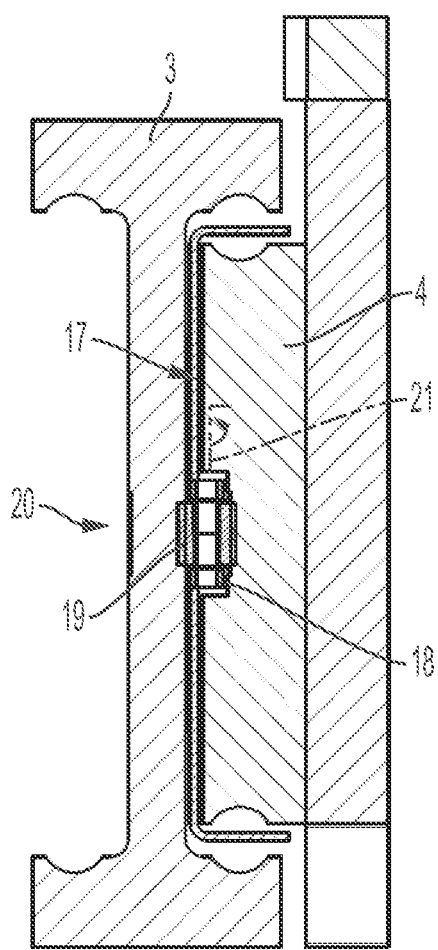
FIG. 4 a further sectional view perpendicular to the longitudinal axis of parts of the first embodiment of a telescopic rail in accordance with the invention.

As can in particular be seen from FIG. 3, the inner rail element 2 and the outer rail element 4 are each longitudinally displaceably supported at the middle rail element 3. The support respectively takes place via rolling members 15 that are guided in rolling member cages 16 and 16'. The rolling members are in particular balls.

In the embodiment, both the inner rail element 2 and the outer rail element 4 each have two guide paths 11 and 12 that each form a guide path for the rolling members 15 with the guide paths 14 and 13 at the middle rail element 3

In the embodiment, the guide paths 11 and 12 are provided at the upper side and at the lower side of the inner rail element 2 or of the outer rail element 4. The middle rail element 3 respectively engages around the inner rail element 2 and the outer rail element 4 at their upper side and at their lower side and has the guide paths 14 and 13 there that are associated with the guide paths 11 and 12.

The rolling members associated with the upper and lower guide paths are each arranged in rolling member cages 16 and 16', with the rolling member cages being connected to one another by a connection region 17 in the embodiment. For example, the rolling member cages 16 and 16' are formed in one piece from a bent sheet metal piece with the connection region 17, with the rolling members being arranged in cutouts of the sheet metal piece.

The connection region therefore extends from the upper rolling member cage 16 between the mutually oppositely disposed side surfaces of the middle rail element and of the inner or outer rail elements to the lower rolling member cage 16'.

In accordance with the first aspect of the present invention, the rail elements 2, 3, and 4 are mechanically force-coupled via a rail synchronization arrangement 5 such that on a longitudinal displacement of the outer rail element 4 with respect to the inner rail element 2, the middle rail element 3 is longitudinally displaced with respect to both the inner and the outer rail element 2, 4.

This is achieved in the first embodiment shown in FIGS. 1 to 5 in that a pinion 6 is supported at the middle rail element 3 and meshes with gear racks 7 and 8 that are provided at the inner and at the outer rail element 2, 4. In the embodiment, the pinion 6 is arranged on the upper side of the middle rail element 3. The gear racks 7 and 8 are arranged at the inner and outer rail elements 2, 4 via installation plates or brackets 10', 10 such that they project over the upper side of the middle rail element 3. The pinion 6 and the gear racks 7 and 8 could also be arranged in the same manner at the lower side of the telescopic rail.

In accordance with the second aspect of the present invention, the rolling member cages 16, 16' for the rolling members 15 provided between the middle rail element 3 and the inner rail element 2 and between the middle rail element 3 and the outer rail element 4 are each mechanically force-coupled to at least one of the rail elements 2, 3, 4 via a rolling member cage synchronization arrangement 20 such that a longitudinal displacement of the middle rail element 3 with respect to the inner or outer rail elements 2, 4 results in a longitudinal displacement of the corresponding rolling member cage 16, 16' with respect to the middle rail element 3.

This is achieved in the first embodiment shown in FIGS. 1 to 5 in that a pinion 19 is supported at the roller member cages 16, 16' and meshes with gear racks 9 that are provided at the middle rail element 3 and at the inner and outer rail elements 2, 4.

In the embodiment, the rolling member cage synchronization arrangement 20 is provided in the region of the connection element 17 of the upper and lower rolling member cages 16, 16'. The pinion 19 is in particular supported at the connection region 17. The gear racks are provided at the side surfaces of the middle rail element and of the inner or outer rail elements disposed opposite each other via the connection region 17.

The inner and outer rail elements have a groove facing the middle rail element in the region of the rolling member cage synchronization arrangement 20 to obtain sufficient space for the pinion and the gear racks.

Figure 5:
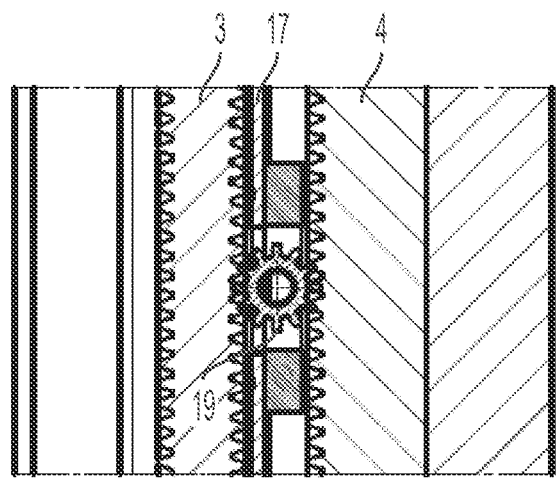
FIG. 5 a sectional view in a horizontal plane along the longitudinal axis of the first embodiment of a telescopic rail in accordance with the invention in the region of the rolling member cage synchronization arrangement.

In the first embodiment shown in FIGS. 1 to 5, the axis of rotation 21 extends in the vertical direction so that mutually oppositely disposed peripheral regions of the pinion 19 mesh with the two gear racks 9, see the sectional view along a horizontal plane in FIG. 5. To save construction space, the gear racks 9 can be directly introduced into the material of the rail elements, for example by milling. Alternatively, they could, however, also be arranged as separate toothed bands at the rail elements or inserted into grooves.

Figure 6:
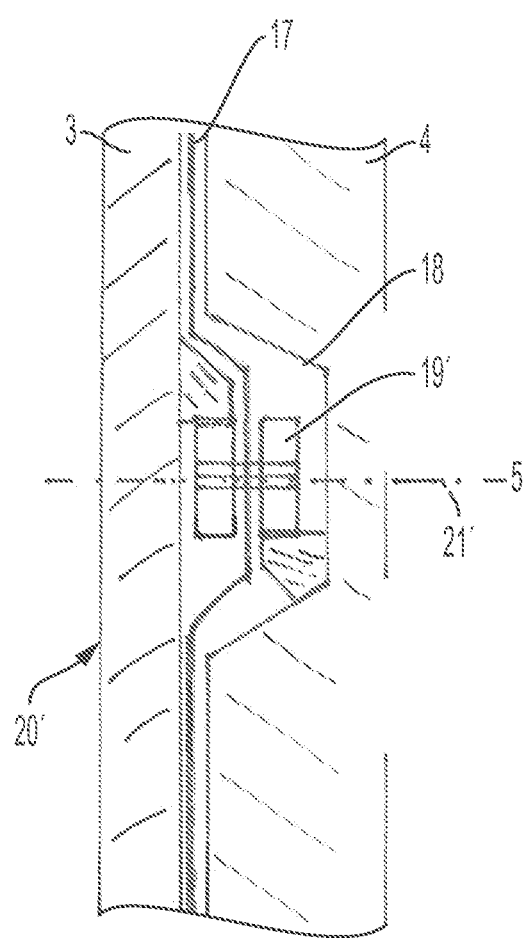
FIG. 6 a sectional view perpendicular to the longitudinal axis of a second embodiment of a telescopic rail in accordance with the invention in the region of the rolling member cage synchronization arrangement.

The alternative embodiment shown in FIG. 6 only differs from the embodiment shown in FIGS. 1 to 5 with respect to the arrangement of the pinion 19' and of the gear racks 9'. The axis of rotation 21' of the pinion 19' extends horizontally here. The pinion 19' is here divided into two gears that are arranged at either side of the connection region 17. In the embodiment, the two gears are arranged on a common shaft that passes through a support in the connection region 17. Each of the two gears meshes with a gear rack 9' at the middle rail element 7 and at the inner or outer rail elements 3, 4, with the gear racks engaging at oppositely disposed sides at the periphery of the gears, i.e. once from above and once from below.

Figure 7:
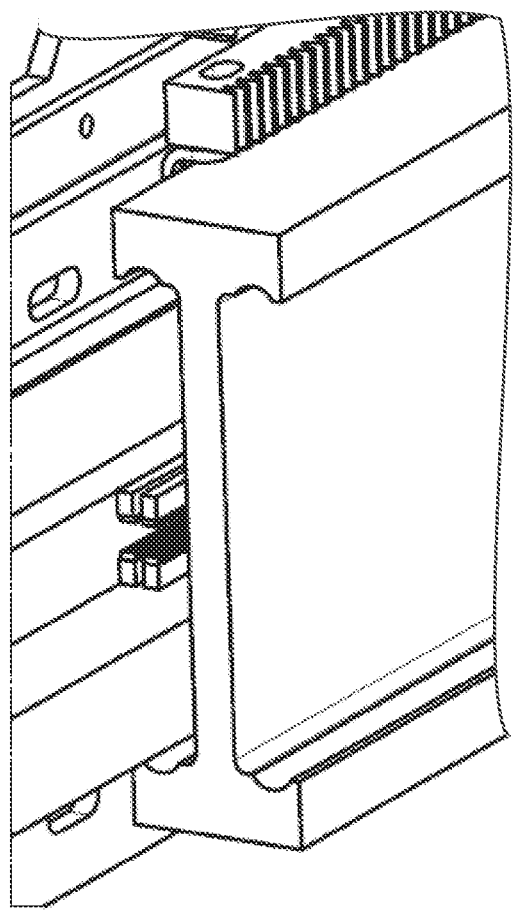
FIG. 7 a perspective detailed representation of the gear racks of the rolling member cage synchronization arrangement in a third embodiment of a telescopic rail in accordance with the invention.
Figure 8:
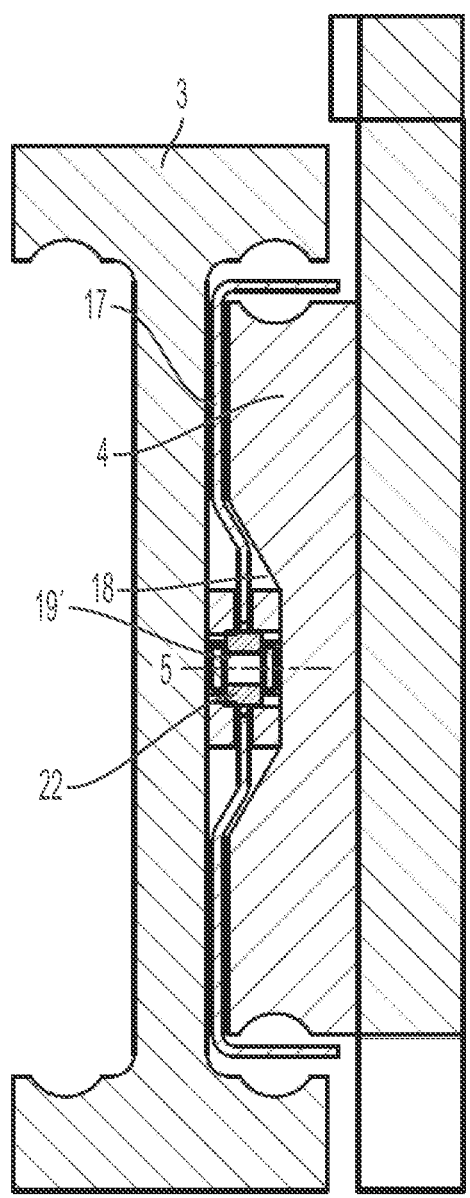
FIG. 8 a sectional view perpendicular to the longitudinal axis of parts of the third embodiment of a telescopic rail in accordance with the invention in the region of the rolling member cage synchronization arrangement.

The further alternative embodiment shown in FIGS. 7 and 8 corresponds to the design shown in FIG. 6, but has gear racks 9' arranged pairwise so that each of the two gears into which the pinion 19' is divided meshes both at it supper side and at its lower side with a gear rack. The two lower pinions are here connected to the one rail element, the two upper pinions are connected to the respective other rail element.

In the previously described embodiments, a plurality of pinions that mesh with the gear racks can be provided along the longitudinal extent of the rolling member cages or of the connection region. For example, a respective pinion can be provided in the front end region and in the rear end region of the connection region.

Figure 9:
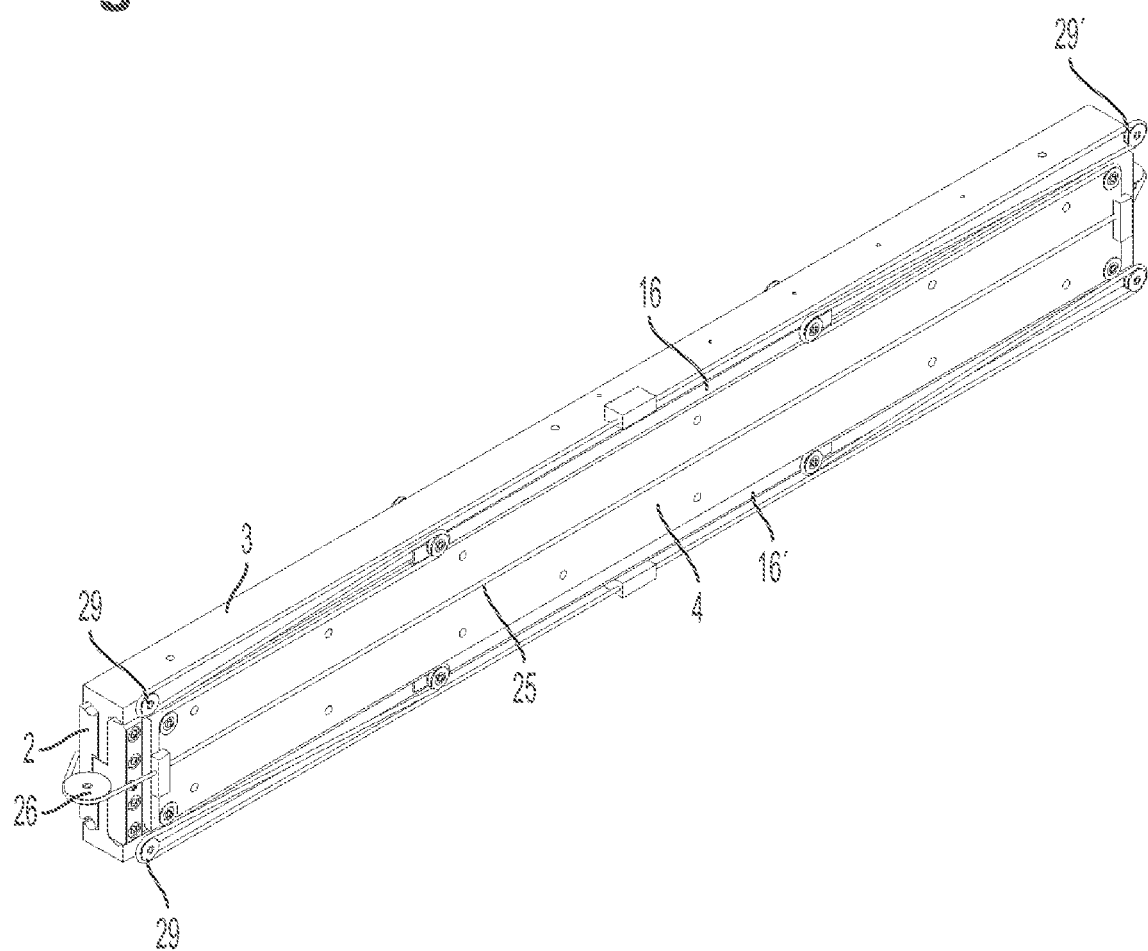
FIG. 9 a perspective representation of a fourth embodiment of a telescopic rail in accordance with the invention.

FIG. 9 now shows an embodiment of a telescopic rail in accordance with the invention that admittedly corresponds to the basic setup of the design shown in FIGS. 1 to 5, but which selects a different design embodiment for the implementation of the rail synchronization arrangement and of the rolling member cage synchronization arrangements.

The rail synchronization arrangement here comprises a rope 25 that extends from a front end region of the outer rail element 4 to which it is fastened along the longitudinal extent of the telescopic rail to a pulley 26 that is arranged at a rear end region of the middle rail element. From there, the rope 25 again extends along the longitudinal extent of the telescopic rail a front end region of the inner rail element 2. The rope here preferably extends between the side surfaces of the inner and/or outer rail elements 2, 4 facing the middle rail element 3 and the middle rail element 3. Due to a travel movement of the outer rail element 4 to the front (to the right in the drawing), the middle rail element 3 is therefore likewise traveled to the front with respect to the inner rail element 2. To also achieve a synchronization for the inward travel movement, a rope arrangement extending in the reverse direction is preferably additionally provided.

The rolling member cage synchronization arrangement is implemented by a rope 27 that is fastened at one side to the middle rail element 3 and which is guided in the manner of Bowden cables around pulleys 28 that are connected to the rolling member cages 16 and 16' via entrainers and are arranged at the outer rail element 4 or at the inner rail element 3. The rolling member cages 16 and 16' hereby move half as fast as the outer rail element 4 or the inner rail element 3. Corresponding Bowden cables are likewise provided in both directions here to ensure a synchronization both on an inward travel movement and on an outward travel movement. The respective pulleys 29 are arranged in the respective front and rear end regions of the rolling member cages 16 and 16'.

The entrainers at which the pulleys are arranged are each led out at the top and bottom between the outer rail element 4 or the inner rail element 2 and the middle rail element 3.

Figure 10:
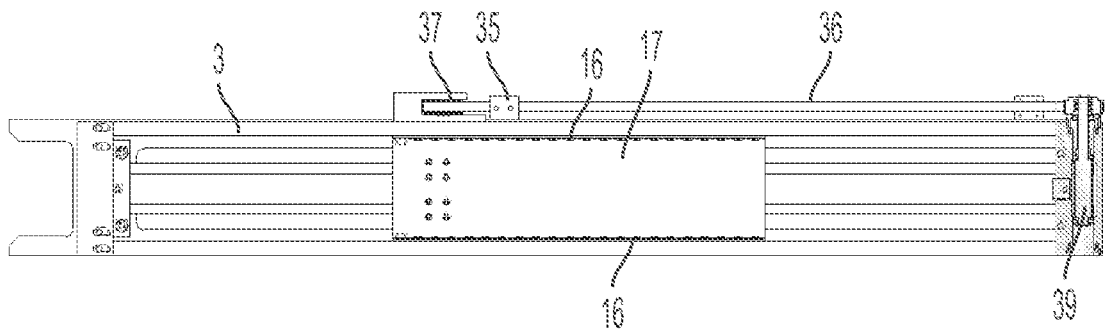
FIG. 10 a side view of a fifth embodiment of a telescopic rail in accordance with the invention.
Figure 11:
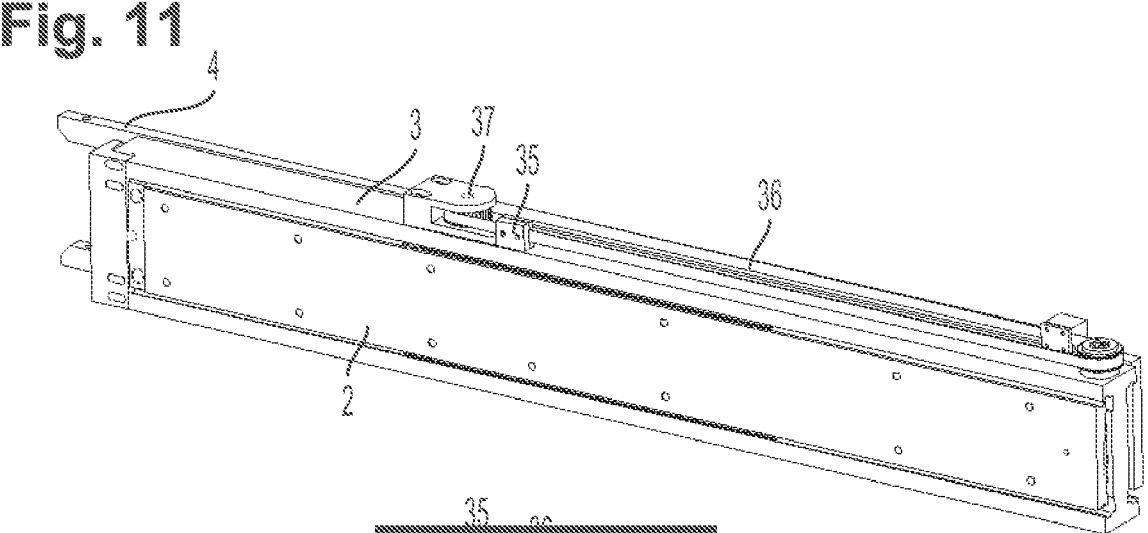
FIG. 11 a perspective representation of a fifth embodiment of a telescopic rail in accordance with the invention.
Figure 12:
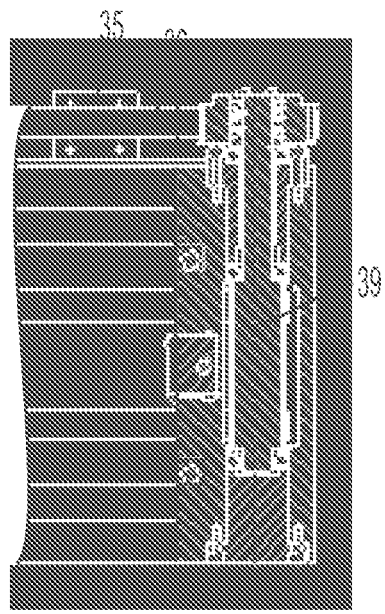
FIG. 12 a sectional view of the fifth embodiment of a telescopic rail in accordance with the invention in the region of the coupling between the rolling member cage synchronization arrangement and the rail synchronization arrangement.

A further embodiment of a telescopic rail in accordance with the invention is shown in FIGS. 10 to 12, with said telescopic rail corresponding to the basic structure of the design shown in FIGS. 1 to 5, but with a different design aspect being selected for the implementation of the rolling member cage synchronization arrangements.

In this embodiment, the rolling member cage synchronization arrangement is driven via a rail synchronization arrangement such as was shown and described within the framework of the first embodiment, but were not drawn again in FIGS. 10 to 12 for better clarity. For this purpose, a pinion that meshes with gear racks at the inner and outer rail elements is arranged at the shaft 39 such as shown in described within the framework of the first embodiment. The shaft 39 is here supported in a front end region of the middle rail element.

The rolling member cage synchronization arrangement now takes place via entrainers 35 that are connected to the rolling member cages 16, 16' and that engage at a peripheral belt 36 that is driven by a drive wheel arranged at the shaft 39 and that runs around a deflection wheel 37 likewise arranged at the middle rail element at the other side. Entrainers 35 are provided at the belt 36 both for the rolling member cages 16, 16' between the middle rail element and the inner rail element and for the rolling member cages 16, 16' between the middle rail element and the outer rail element so that they are coupled via the belt. The entrainers are here led out at the top between the outer rail element 4 or the inner rail element 2 and the middle rail element 3. The belt drive could also be arranged at the lower side.

Figure 13:
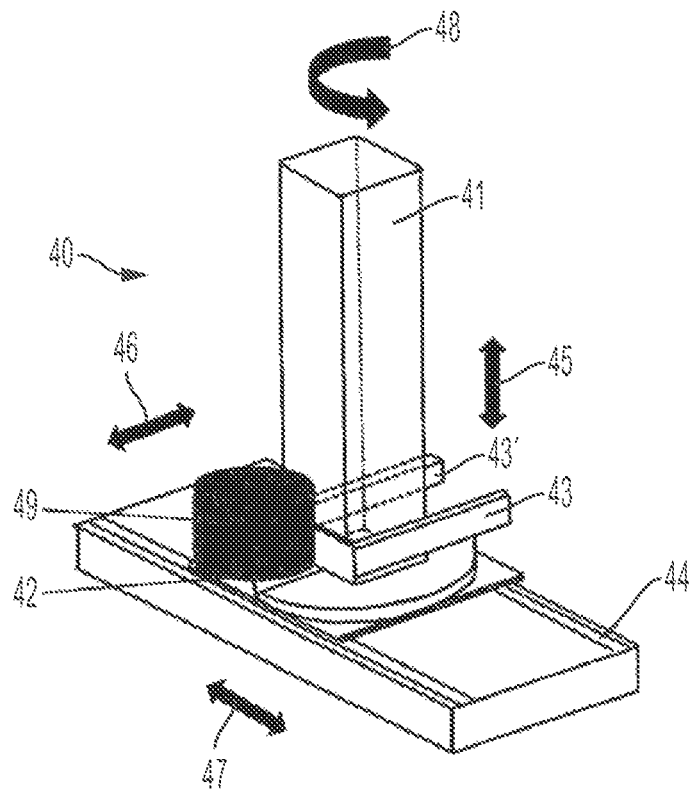
FIG. 13 an embodiment of a racking storage and retrieval vehicle in accordance with the present invention.

FIG. 13 shows an embodiment for a workpiece handling device 40 or for a workpiece handling system in which telescopic rails in accordance with the invention provide a horizontal travel movement of the workpieces.

A handling element 42 for workpieces 49, in particular a gripper, a fork, and/or a placement board, is in this respect arranged via at least two telescopic rails 43, 43' at a base element 41, with the base element preferably having one or more axes of movement. In the embodiment, a slide at which the inner rail elements of the telescopic rails 43, 43' are installed is vertically travelable in the direction 45 at the base element 41 in the form of a tower. The base element 41 is furthermore rotatable about a vertical axis of rotation 48 and is travelable in the horizontal direction 46 and/or 47 at a guide 44.

Figure 14:
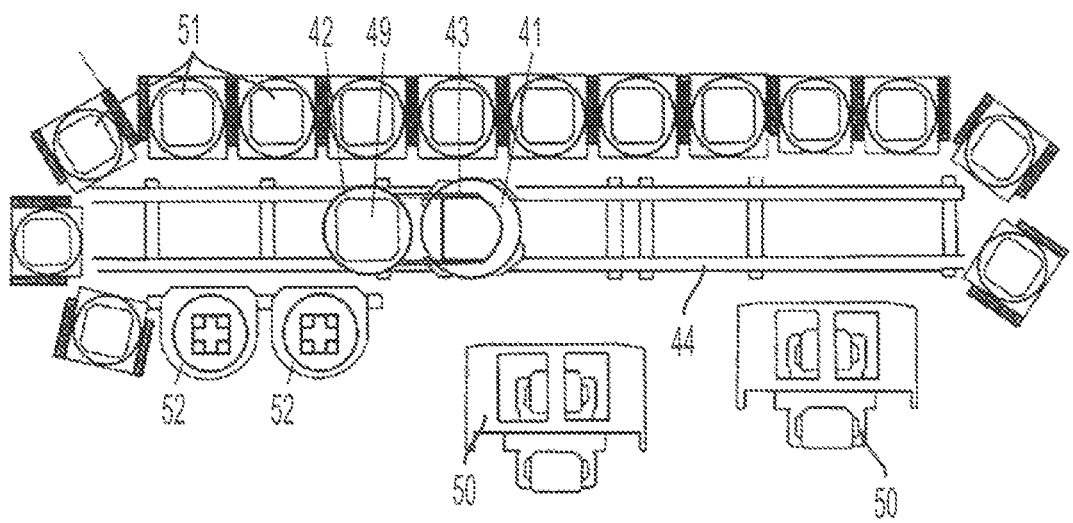
FIG. 14 an embodiment of a pallet storage system with a racking storage and retrieval vehicle in accordance with the invention.

FIG. 14 shows a workpiece handling system in the form of a pallet store having a workpiece handling device 40 such has is shown in FIG. 13. A plurality of storage cells 51, setup stations 15, 16 and machine tools 50 are here arranged in a ring around the base element 41 travelable on the guide 44. Workpieces and/or pallets having one or more workpieces can be traveled into the storage cells 51, setup stations 15, 16, and machine tools 50 or can be removed from them again by an extension of the telescopic rails.

We refer to DE 10 2016 009 000 A1 with respect to further details and variants of the workpiece handling system.

The invention claimed is:

1. A telescopic rail: comprising
at least one inner rail element, at least one middle rail element, and at least one outer rail element, wherein the inner rail element and the outer rail element are each longitudinally displaceably supported at the middle rail element over rolling members that are guided in a rolling member cage, and
at least one out of:
a rail synchronization arrangement configured such that the rail elements are mechanically force-coupled via the rail synchronization arrangement such that on a longitudinal displacement of the outer rail element with respect to the inner rail element, the middle rail element is longitudinally displaced with respect to both the inner rail element and the outer rail element; and
a rolling member cage synchronization arrangement configured such that at least one rolling member cage is mechanically force-coupled to at least one of the inner rail element and the outer rail element via the respective rolling member cage synchronization arrangement such that a longitudinal displacement of the middle rail element with respect to the at least one of the inner rail element and the outer rail element results in a longitudinal displacement of the corresponding rolling member cage with respect to the middle rail element.

2. The telescopic rail in accordance with claim 1, wherein the rolling member cage synchronization arrangement is configured such that the longitudinal displacement of the rolling member cage with respect to the middle rail element corresponds to half the longitudinal displacement of the corresponding rail element with respect to the middle rail element.

3. The telescopic rail in accordance with claim 1, wherein the rail synchronization arrangement is configured such that the longitudinal displacement of the inner rail element with respect to the middle rail element corresponds to the longitudinal displacement of the middle rail element with respect to the outer rail element.

4. The telescopic rail in accordance with claim 1, wherein the rail synchronization arrangement comprises a pinion that is supported at the middle rail element and meshes with gear racks that are provided at the inner rail element and the outer rail element.

5. The telescopic rail in accordance with claim 1, wherein the rail synchronization arrangement comprises at least one pulling element of a rope or a belt, whose ends are fastened to the inner rail element and to the outer rail element and that is deflected via a deflection element provided at the middle rail element, with two pulling elements that act in opposite directions being provided.

6. The telescopic rail in accordance with claim 1, wherein the at least one rolling member cage synchronization arrangement comprises a pinion that is supported at the rolling member cage and meshes with gear racks that are provided at the rail elements associated with the respective rolling member cage.

7. The telescopic rail in accordance with claim 1, wherein the inner rail element and the outer rail element each have two parallel guide paths that are arranged above one another in the vertical direction and are associated with corresponding guide paths of the middle rail element and on which the rolling members roll off, with the rolling member cages for the rolling members associated with the two guide paths being fixedly connected to one another via a connection region, and with the connection region extending between mutually facing side surfaces of the middle rail element and of the inner rail element or the outer rail element.

8. The telescopic rail in accordance with claim 7, wherein the rolling member cage synchronization arrangement is arranged and/or engages at the connection region, with a pinion of the rolling member cage synchronization arrangement being supported at the connection region.

9. The telescopic rail in accordance with claim 1, wherein the rolling member cage synchronization arrangements are only force-coupled to the rail synchronization arrangement via the respective rail elements.

10. The telescopic rail in accordance with claim 1, wherein the rolling member cage synchronization arrangement comprises at least one pulling element via which the rolling member cage is connected to the middle rail element and to the inner or outer rail element, with the pulling element being guided in the form of a pulley block around a deflection element that is connected to the rolling member cage, and/or with separate pulling elements being provided for movements in both directions.

11. The telescopic rail in accordance with claim 1 having a drive that engages at the inner rail element or at the outer rail element to displace the rail elements with respect to one another, with the drive taking place via a belt that runs around and that is coupled to the inner rail element or to the outer rail element via an entrainer.

12. The telescopic rail in accordance with claim 1, wherein the outer rail element is longitudinally displaceable by a maximum of its own length with respect to the inner rail element; and/or wherein the middle rail element engages around the inner and/or outer rail element(s) on the upper side or the lower side, with the inner and/or outer rail element(s) having guide paths on which the rolling members roll off on the upper side and on the lower side.

13. A workpiece handling system having at least one telescopic rail in accordance with claim 1, wherein a handling element for workpieces is arranged at a base element via at least two telescopic rails, with the base element having one or more movement axes.

14. The workpiece handling system in accordance with claim 13, wherein it is a racking storage and retrieval vehicle for a pallet storage system, with the handling element serving the introduction and/or removal of workpieces and/or pallets into/out of storage compartments.

15. The telescopic rail in accordance with claim 1, wherein the inner rail element and the outer rail element are positioned at least partly within cavities of the middle rail element, the middle rail element comprising guide paths for receiving the rolling members on upper and lower inner faces of each of the cavities, and each of the inner rail element and outer rail element comprise respective guide paths for receiving the rolling members on respective upper and lower faces.

16. The telescopic rail in accordance with claim 15, wherein the rolling member cages for the rolling members associated with the guide paths on upper and lower faces are fixedly connected to one another via a connection region, with the connection region extending between mutually facing side surfaces of the middle rail element and of the inner rail element or outer rail element.

17. The telescopic rail in accordance with claim 1, wherein the rolling member cage synchronization arrangement is arranged between an interior face of the middle rail element and an interior face of the inner rail element or outer rail element.

18. A telescopic rail: comprising at least one inner rail element, at least one middle rail element, and at least one outer rail element, wherein the inner rail element and outer rail element are each longitudinally displaceably supported at the middle rail element over rolling members that are guided in a rolling member cage, wherein the rail elements are mechanically force-coupled via a rail synchronization arrangement such that on a longitudinal displacement of the outer rail element with respect to the inner rail element, the middle rail element is longitudinally displaced with respect to both the inner rail element and the outer rail element; and at least one rolling member cage is mechanically force-coupled to at least one of the rail elements via a respective rolling member cage synchronization arrangement such that a longitudinal displacement of the middle rail element with respect to the inner rail element or outer rail element results in a longitudinal displacement of the corresponding rolling member cage with respect to the middle rail element, wherein the rolling member cage synchronization arrangements are force-coupled to the rail synchronization arrangement via a coupling arrangement, with the rolling member cages being driven by the rail synchronization arrangement, via at least one pulling element and with the pulling element including at least one of the following: coupling the rolling member cages to one another, running around a drive element that is driven by a pinion of the rail synchronization arrangement, and arranged at the middle rail element.

* * * * *